United States Patent Office 2,773,870
Patented Dec. 11, 1956

2,773,870

1-(LOWER ALKYL)-4-PHENYL-4-(TERTIARY-AMINOALKOXYMETHYL- AND TERTIARY-AMINOALKOXY) PIPERIDINES AND THEIR PREPARATION

Bill Elpern, Albany, N. Y., assignor to Sterling Drug Inc., New York, N. Y., a corporation of Delaware No Drawing. Application June 4, 1953,
Serial No. 359,637

17 Claims. (Cl. 260—247.7)

This invention relates to 1-(lower alkyl)-4-phenyl-4-(tertiary-aminoalkoxy- and tertiary-aminoalkoxymethyl) piperidines, to their salts, and to the preparation of these compounds.

My new compounds in their free base form have the general formula

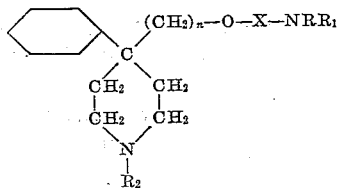

where $n$ is zero or one, X is a lower alkylene radical whose two free valence bonds are on different carbon atoms, $NRR_1$ is a tertiary-amino radical and $R_2$ is a lower alkyl radical. These piperidine derivatives of my invention have been found to possess useful pharmacological properties, in particular, analgesic activity.

In the above general formula the lower alkylene radical designated as X has two to four carbon atoms, including such examples as

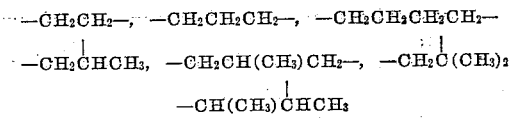

and the like. The tertiary-amino radical, shown above as $NRR_1$, comprehends dialkylamino radicals where R and $R_1$ are lower alkyl groups, alike or different, and each alkyl group has one to six carbon atoms, such dialkylamino radicals including dimethylamino, diethylamino, ethylmethylamino, diisopropylamino, ethyl-n-propylamino, di-n-butylamino, di-n-hexylamino, and the like. Further, the tertiary-amino radical designated as $NRR_1$ encompasses saturated N-heteromonocyclic radicals having five to six ring atoms, illustrated by examples such as 1-piperidyl; (lower alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl such as 2-methyl-1-pyrrolidyl, 3-ethyl-1-pyrrolidyl, 2,5-dimethyl-1-pyrrolidyl; 4-morpholinyl; and the like. $R_2$, the lower alkyl radical, has one to six carbon atoms, including such radicals as methyl, ethyl, n-propyl, n-butyl, isobutyl, 2-butyl, n-amyl, isoamyl, n-hexyl, and the like.

The 1-(lower alkyl)-4-phenyl-4-(tertiary-aminoalkoxy- and tertiary-aminoalkoxymethyl)piperidines of my invention were prepared by heating an alkali metal salt of a 1-(lower alkyl)-4-phenyl-4-piperidinol or -4-piperidinemethanol with a tertiary-aminoalkyl halide of the formula halogen-X-$NRR_1$. Illustrations of this process are the preparations of 1-ethyl-4-phenyl-4-(2-diethylaminoethoxymethyl)piperidine or 1-ethyl-4-phenyl-4-(2-diethylaminoethoxy)piperidine by heating the sodium salt of 1-ethyl-4-phenyl-4-piperidinemethanol or 1-ethyl-4-phenyl-4-piperidinol with 2-diethylaminoethyl chloride. In practicing my invention I found it convenient to use the tertiary-aminoalkyl halide in the form of its hydrohalide salt, the acid portion of which was neutralized by excess sodium amide, the reagent I preferred to use in forming the alkali salt of the intermediate 4-piperidinol or 4-piperidinemethanol.

Preferred embodiments of my invention are quaternary ammonium salts of the above defined 1-(lower alkyl)-4-phenyl-4-(tertiary-aminoalkoxy- and tertiary-aminoalkoxymethyl)piperidines, said salts having the general formula

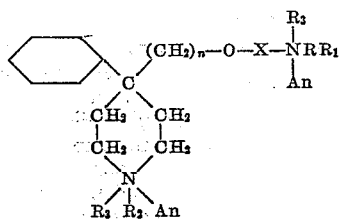

where $n$, X, $R_2$ and $NRR_1$ have the meanings given above, $R_3$ is a lower alkyl radical or a benzyl radical and An is a non-toxic anion. These quaternary ammonium salts have been found to have curarimimetic and ganglionic blocking properties.

In the above formula, $R_3$ is a lower alkyl radical having one to six carbon atoms, including such radicals as methyl, ethyl, n-propyl, isopropyl, n-butyl, isobutyl, 2-butyl, n-amyl, isoamyl, n-hexyl, and the like. The non-toxic anion, designated as An, which can be any anion, for instance, chloride, bromide, iodide, sulfate, benzenesulfonate, para-toluenesulfonate, and the like, has no appreciable pharmacological activity of its own in the high dilutions at which the quaternary ammonium salts as a whole are effective. In particular, the anions contribute nothing to the ganglionic blocking or curarimimetic activity which resides solely in the remainder of the molecule.

Thus, my invention comprehends, as the preferred embodiment, quaternary ammonium salts of the above defined 1-(lower alkyl)-4-phenyl-4-(tertiary-aminoalkoxy- and tertiary-aminoalkoxymethyl)-piperidines, said salts being prepared by treating my piperidines with a lower alkyl or benzyl ester of an acid, either inorganic or organic, such esters having the formula $R_3$An and including methyl iodide, methyl bromide, ethyl chloride, ethyl bromide, ethyl sulfate, n-propyl iodide, benzyl chloride, para-nitrobenzyl chloride, para-chlorobenzyl chloride, methyl para-toluenesulfonate, ethyl para-toluenesulfonate, ethyl benzenesulfonate, and the like, the respective quaternary salts being the methiodides, methobromides, ethochlorides, ethobromides, ethosulfates, n-propiodides, benzochlorides, para-nitrobenzochlorides, para-chlorobenzochlorides, metho-para-toluenesulfonates, ethopara-toluenesulfonates, ethobenzenesulfonates, and the like.

Sometimes direct addition of an ester, $R_3$An, to the 1-(lower alkyl)-4-phenyl-4-(tertiary-aminoalkoxy- or tertiary-aminoalkoxymethyl)-piperidine does not occur readily due to the properties of the particular ester used. This is the case if the anion, An, is derived from a relatively weak acid such as citric acid or tartaric acid. In such cases it is possible by use of metathetical reactions to replace the anion without reconversion to the tertiary amine. This is usually effected by treatment of an aqueous solution of the quaternary ammonium salt, QAn, with silver oxide (hydroxide). The silver salt, AgAn, is precipitated, leaving in solution the quaternary ammonium hydroxide, QOH. It is prerequisite, of course, that the salt AgAn be insoluble in water. The quaternary ammonium hydroxide may then be neutralized with the appropriate acid, HAn', to give any desired salt. For example, methiodides are generally easier to prepare by direct addition than methochlorides. Methyl iodide reacts more readily with tertiary-amines and is more convenient to use than methyl chloride. However, the methochloride can be readily prepared from the methiodide by the method just described. Treatment of a solution of the methiodide with silver oxide precipitates silver iodide leaving a solution of the quaternary ammonium hydroxide. Neutralization of this solution with hydrochloric acid gives the methochloride which can be obtained by concentrating the solution. Similarly, using citric or tartaric acid in place of hydrochloric acid, the respective methocitrate or methotartrate is obtained.

My invention also comprehends acid addition salts of the above described 1-(lower alkyl)-4-phenyl-4-(tertiary-aminoalkoxy- and tertiary - aminoalkoxymethyl)piperidines, such salts being prepared by treating the basic piperidine derivatives with the appropriate acid. Included among such acid addition salts are the following, formed by reacting the basic piperidine compound with the appropriate relatively non-toxic inorganic or organic acid: the hydrochloride, hydrobromide, hydroiodide, phosphate, sulfate, sulfamate, ethanesulfonate, tartrate, citrate, succinate, acetate, benzoate, oleate, and the like.

The compounds of my invention are further illustrated by the following examples without however being limited thereto.

EXAMPLE 1

*1-methyl-4-phenyl-4-[2-(1-piperidyl)ethoxymethyl]piperidine*

To 1.95 g. of sodium amide suspended in 200 ml. of dry toluene was added 10.2 g. of 1-methyl-4-phenyl-4-piperidinemethanol and the resulting mixture refluxed until complete solution was effected. The solution was cooled slightly and then there was added another 1.95 g. portion of sodium amide followed by 9.2 g. of 2-(1-piperidyl)ethyl chloride hydrochloride. The resulting mixture was refluxed for about three hours or until evolution of ammonia ceased. It was then cooled and 50 ml. of water was added carefully to dissolve any unreacted sodium amide and the sodium chloride that had separated. The organic layer was separated and washed with water. The aqueous layer was extracted with benzene and the extracts combined with the organic layer. The resulting solution was filtered and the solvent removed by distillation in vacuo. Fractional distillation of the residual material yielded the product, 1-methyl-4-phenyl-4-[2-(1-piperidyl)ethoxymethyl]piperidine, B. P. 224–225° C. at 12 mm., $n_D^{25}$ 1.5251.

*Analysis.*—Calcd. for $C_{20}H_{32}N_2O$: C, 75.90; H, 10.20; N, 8.85. Found: C, 75.84; H, 10.29; N, 8.68.

1 - methyl-4-phenyl - 4-[2-(1-piperidyl)ethoxymethyl]-piperidine, in the form of its hydrochloride salt (prepared by dissolving the base in 0.1 1N aqueous HCl and adjusted the pH to about 5.5 using 0.1 NaOH), was found to have analgesic activity in the aminopyrine range when tested by the radiant thermal stimulation tests in rats.

Other 1-(lower allkyl)-4-phenyl-4-(tertiary-aminoalkoxymethyl)-piperidines can be prepared according to the foregoing procedure using the appropriate 1-(lower alkyl)-4-phenyl-4-piperidinemethanol and tertiary-aminoalkyl halide, such compounds including the following: 1-isopropyl-4-phenyl-4-[2-(3-ethyl-1-piperidyl)ethoxymethyl]-piperidine, 1 - methyl-4-phenyl-4[3-(1-pyrrolidyl)propoxymethyl]piperidine, 1-ethyl-4-phenyl-4-[2-(2,5-dimethyl-1-pyrrolidyl)ethoxymethyl]piperidine, 1-methyl-4-phenyl-4-[4 - (1 - piperidyl)butoxymethyl]piperidine, 1-n-hexyl-4-phenyl-4-[3-(1-piperidyl)-propoxymethyl]piperidine, and the like.

EXAMPLE 2

*1 - methyl - 4 - phenyl - 4 - (2 - diethylaminoethoxymethyl)piperidine*

This preparation was carried out following the procedure described in Example 1, using 10.2 g. of 1-methyl-4-phenyl-4-piperidinemethanol, 8.6 g. of 2-diethylaminoethyl chloride hydrochloride, 3.90 g. of sodium amide (added in two equal portions as above) and 200 ml. of dry toluene. There was thus obtained 1-methyl-4-phenyl-4-(2-diethylaminoethoxymethyl)-piperidine, B. P. 174–176° C. at 3.5 mm., $n_D^{25}$ 1.5138.

*Analysis.*—Calcd. for $C_{19}H_{32}N_2O$: C, 74.94; H, 10.59; N, 9.22. Found: C, 74.53; H, 11.00; N, 8.99.

1 - methyl - 4-phenyl - 4-(2-diethylaminoethoxymethyl) piperidine, in the form of its hydrochloride salt (prepared by dissolving the base in 0.1 1N aqueous HCl and adjusted the pH to about 5.5 using 0.1 NaOH), was found to have anglesic activity in the aminopyrine range when tested by the radiant thermal stimulation tests in rats.

Other compounds which can be prepared according to the above procedure include the following: 1-methyl-4-phenyl - 4-(4-dimethylaminobutoxymethyl)piperidine, 1-ethyl - 4 - phenyl - 4 - (3 - diethylamino - 2 - methylpropoxymethyl) - piperidine, 1-methyl-4 - phenyl - 4-(2-di-n-butylaminoethoxymethyl) - piperidine, 1 - isobutyl - 4 - phenyl - 4(3 - diethylaminopropoxymethyl)piperidine, and the like.

EXAMPLE 3

*1 - methyl - 4 - phenyl - 4 - [2 - (1 - piperidyl)ethoxymethyl]piperidine dimethiodide*

A solution of 6.5 g. of 1-methyl-4-phenyl-4-[2-(1-piperidyl)ethoxymethyl]piperidine (prepared as in Example 1) in about 25 ml. of dry benzene was treated with an excess of methyl iodide (about 10 ml.). The precipitate that separated was recrystallized several times from ethanol, yielding the product 1-methyl-4-phenyl-4-[2-(1-piperidyl)ethoxymethyl]piperidine dimethiodide, M. P. 240–241.6° C.

*Analysis.*—Calcd. for $C_{22}H_{38}I_2N_2O$: C, 44.00; H, 6.38; I, 42.28. Found: C, 43.88; H, 6.38; I, 41.89.

When the procedure described above for the preparation of 1 - methyl - 4 - phenyl - 4 - [2 - (1 - piperidyl) ethoxymethyl]piperidine dimethiodide is followed using methyl bromide, ethyl chloride, n-propyl iodide, benzyl chloride or ethyl para-toluenesulfonate in place of methyl iodide, there is obtained, respectively, 1 - methyl - 4-phenyl - 4 -[2 - (1 - piperidyl)ethoxymethyl]piperidine dimethobromide, 1 - methyl - 4 - phenyl - 4 - [2 - (1 - piperidyl)ethoxymethyl]piperidine diethochloride, 1-methyl - 4 - phenyl - 4 - [2 - (1 - piperidyl)ethoxymethyl]-piperidine di - n - propiodide, 1 - methyl - 4 - phenyl - 4-[2 - (1 - piperidyl)ethoxymethyl]piperidine dibenzochloride or 1 - methyl - 4 - phenyl - 4 - [2 - (1 - piperidyl)-ethoxymethyl]piperidine dietho-para-toluenesulfonate.

Following the above procedure for the preparation of 1 - methyl - 4 - phenyl - 4 - [2 - (1 - piperidyl)ethoxymethyl]piperidine dimethiodide using the appropriate piperidine derivative in place of 1 - methyl - 4 - phenyl-4 - [2 - (1 - piperidyl)ethoxymethyl]piperidine, there can be obtained the following quaternary salts: 1-isopropyl-4 - phenyl - 4 - [2 - (3 - ethyl - 1 - piperidyl)ethoxymethyl]piperidine dimethiodide, 1-methyl-4-phenyl-4-[3-(1-pyrrolidyl)-propoxymethyl]piperidine dimethiodide, 1-ethyl - 4 - phenyl - 4 - [2 - (2,5 - dimethyl - 1 - -pyrrolidyl)ethoxymethyl]piperidine dimethiodide, 1-methyl-4-phenyl - 4 - [4 - (1 - piperidyl)butoxymethyl]piperidine dimethiodide, 1 - n - hexyl - 4 - phenyl - 4 - [3 - (1-piperidyl)propoxymethyl]piperidine dimethiodide, and the like.

EXAMPLE 4

*1 - methyl - 4 - phenyl - 4 - (2 - diethylaminoethoxymethyl)piperidine dimethiodide*

This compound, M. P. 208.4–209.5° C. (cor.), was prepared following the procedure described in Example 3 using a solution of 6.75 g. of 1-methyl-4-phenyl-4-(2-diethylaminoethoxymethyl)piperidine in about 25 ml. of dry benzene and 10 ml. of methyl iodide.

*Analysis.*—Calcd. for $C_{21}H_{38}I_2N_2O$: C, 42.87; H, 6.51; I, 43.14. Found: C, 42.71; H, 6.57; I, 42.85.

Other 1-(lower alkyl)-4-phenyl-4-(dialkylaminoalkoxymethyl)piperidine dimethiodides which can be prepared according to the foregoing procedure include the following: 1-methyl-4-phenyl-4-(4-dimethylaminobutoxymethyl)piperidine dimethiodide, 1-ethyl-4-phenyl-4-(3-diethylamino-2-methylpropoxymethyl)piperidine dimethiodide, 1-methyl-4-phenyl-4-(2-di-n-butylaminoethoxymethyl)piperidine dimethiodide, 1-isobutyl-4-phenyl-4-(3-diethylaminopropoxymethyl)piperidine dimethiodide, and the like.

EXAMPLE 5

*1-methyl-4-phenyl-4-(2-dimethylaminoethoxymethyl)-piperidine dimethiodide*

The preparation of 1-methyl-4-phenyl-4-(2-dimethylaminoethoxymethyl)piperidine was carried out following the procedure described in Example 1 using 8.2 g. of 1-methyl-4-phenyl-4-piperidinemethanol, 5.76 g. of 2-dimethylaminoethyl chloride hydrochloride, 3.54 g. of sodium amide (added in two equal portions) and 150 ml. of dry toluene. Eight grams of this compound was obtained as a yellow oil following removal of the benzene and toluene from the reaction mixture by distilling in vacuo.

One-half of the oily 1-methyl-4-phenyl-4-(2-dimethylaminoethoxymethyl)piperidine was dissolved in enough dry benzene to make 25 ml. of solution which was treated with 10 ml. of methyl iodide. The white oily material that separated solidified to a porous mass on cooling. This solid was collected and recrystallized once from methanol-isopropanol, once from ethanol and once from isopropanol, yielding the product, 1-methyl-4-phenyl-4-(2-dimethylaminoethoxymethyl)piperidine dimethiodide, M. P. 243.8–245.7° C. (cor.).

*Analysis*—Calcd. for $C_{19}H_{34}I_2N_2O$: C, 40.69; H, 6.12; I, 45.30. Found: C. 40.95; H, 6.24; I, 45.30.

EXAMPLE 6

*1-methyl-4-phenyl-4-[2-(4-morpholinyl)ethoxymethyl]-piperidine dimethiodide*

This preparation was carried out following the procedure described in Example 5, using 10.2 g. of 1-methyl-4-phenyl-4-piperidinemethanol, 9.3 g. of 2-(4-morpholinyl)-ethyl chloride hydrochloride, 9.7 g. of sodium amide and 200 ml. of dry toluene. There was thus obtained as a yellow oil, 15 g. of 1-methyl-4-phenyl-4-[2-(4-morpholinyl)ethoxymethyl]piperidine which was dissolved in 100 ml. of acetone and the resulting solution treated with 15 ml. of methyl iodide. The product that separated was collected and recrystallized several times from ethanol, yielding the product, 1-methyl-4-phenyl-4-[2-(4-morpholinyl)ethoxymethyl]piperidine dimethiodide, M. P. 249–250° C. (cor.).

*Analysis*—Calcd. for $C_{21}H_{36}I_2N_2O_2$: C. 41.87; H, 6.02; I, 42.14. Found: C, 41.95; H, 6.18; I, 41.80.

EXAMPLE 7

*1-methyl-4-phenyl-4-[3-(1-piperidyl)propoxymethyl]-piperidine dimethiodide*

1-methyl-4-phenyl-4-[3-(1-piperidyl)propoxymethyl]-piperidine, B. P. 176–196° C. at 0.5 mm., was prepared following the procedure described in Example 5, using 10.2 g. of 1-methyl-4-phenyl-4-piperidinemethanol, 9.8 g. of 3-(1-piperidyl)propyl chloride hydrochloride, 9.7 g. of sodium amide and 200 ml. of dry toluene. This product was obtained as a viscous, water-white oil which solidified on standing.

To a solution of 9 g. of 1-methyl-4-phenyl-4-[3-(1-piperidyl)-propoxymethyl]piperidine dissolved in 100 ml. of acetone was added 10 g. of methyl iodide. The white precipitate that separated was collected and recrystallized from water-ethanol, yielding 1-methyl-4-phenyl-4-[3-(1-piperidyl)propoxymethyl]piperidine dimethiodide, M. P. 270.4–272.5° C. (cor.).

*Analysis*—Calcd. for $C_{23}H_{40}I_2N_2O$: C, 44.96; H, 6.56; I, 41.31. Found: C, 45.15; H, 6.47; I, 40.70.

The 1-(lower alkyl)-4-phenyl-4-(tertiary-aminoalkoxymethyl)piperidine quaternary salts of Examples 3–7 when tested for curarimimetic activity in mice using the inclined screen test were found to have $ED_{50}$'s of about 5 to 20 mg./kg., and when tested for ganglionic blocking activity in anesthetized dogs were found to be from two to eight times as effective as tetraethylammonium bromide in blocking each of the parasympathetic and sympathetic ganglia. The acute toxicities ($LD_{50}$) of these quaternary salts when tested subcutaneously in mice were found to be from about 14 to 62 mg./kg.

EXAMPLE 8

*1-methyl-4-phenyl-4-[2-(1-piperidyl)ethoxy]piperidine*

To 3 g. of sodium amide suspended in 150 ml. of dry toluene was added 5 g. of 1-methyl-4-phenyl-4-piperidinol and the resulting mixture was refluxed for about one hour. The solution was cooled to about 60° C. and 4.8 g. of 2-(1-piperidyl)ethyl chloride hydrochloride was added. The resulting mixture was refluxed for about three hours, cooled to about 30° C. and 50 ml. of water was added carefully with stirring to dissolve any unreacted sodium amide and the sodium chloride that had separated. The organic layer was separated, washed with water and distilled in vacuo on a steam bath to remove the solvent. The viscous, residual oil (7 g.) was fractionally distilled, yielding, as a clear yellow oil, the product, 1-methyl-4-phenyl-4-[2-(1-piperidyl)ethoxy]piperidine, B. P. 168–188° C. at 0.8 mm.

Other 1-(lower alkyl)-4-phenyl-4-(tertiary-aminoalkoxy)piperidines can be prepared according to the foregoing procedure using the appropriate 1-(lower alkyl)-4-phenyl-4-piperidinol and tertiary-aminoalkyl halide, such compounds including the following: 1-methyl-4-phenyl-4-(2-diethylaminoethoxy)piperidine, 1-n-hexyl-4-phenyl-4-(4-dimethylaminobutoxy)piperidine, 1-isopropyl-4-phenyl-4-(2-di-n-butylaminoethoxy)piperidine, 1-ethyl-4-phenyl-4-[3-(2-methyl-1-piperidyl)propoxy]piperidine, 1-methyl-4-phenyl-4-[2-(2,5-dimethyl-1-pyrrolidyl)ethoxy]piperidine, 1-isobutyl-4-phenyl-4-[3-(1-pyrrolidyl)propoxy]piperidine, 1-methyl-4-phenyl-4-[2-(4-morpholinyl)-ethoxy]piperidine, and the like.

EXAMPLE 9

*1-methyl-4-phenyl-4-[2-(1-piperidyl)ethoxy]piperidine dimethiodide*

A solution of 5.5 g. of 1-methyl-4-phenyl-4-[2-(1-piperidyl)ethoxy]piperidine in 150 ml. of ethyl acetate was treated with 10 ml. of methyl iodide. The resulting crystalline precipitate was collected, washed with ethyl acetate and recrystallized once from absolute ethanol and once from methanol-ethanol. The resulting product, 1-methyl-4-phenyl-4-[2-(1-piperidyl)ethoxy]piperidine dimethiodide, M. P. 251.5–252.5° C. (cor.).

*Analysis*—Calcd. for $C_{21}H_{36}I_2N_2O$: C, 43.01; H, 6.19; I, 43.29. Found: C, 43.22; H, 6.17; I, 43.08.

1-methyl-4-phenyl-4-[2-(1-piperidyl)ethoxy]piperidine dimethiodide when tested for curarimimetic activity in mice using the incline screen test was found to have an $ED_{50}$ of 70±7 mg./kg. and when tested for ganglionic blocking activity in anesthetized dogs was found to be one-half as effective as tetraethylammonium bromide in blocking each of the parasympathetic and sympathetic ganglia. The activity toxicity ($ALD_{50}$) of 1-methyl-4-phenyl-4-[2-(1-piperidyl)ethoxy]piperidine dimethiodide when tested subcutaneously in mice was found to be about 280 mg./kg.

When the procedure described above for the preparation of 1-methyl-4-phenyl-4-[2-(1-piperidyl)ethoxy]-piperidine dimethiodide is followed using methyl bromide, ethyl chloride, n-propyl iodide, benzyl chloride or ethyl para-toluenesulfonate in place of methyl iodide, there is obtained, respectively, 1-methyl-4-phenyl-4-[2-(1-piperidyl)ethoxy]piperidine dimethobromide, 1-methyl-4-phenyl-4-[2-(1-piperidyl)ethoxy]piperidine diethochloride, 1-methyl-4-phenyl-4-[2-(1-piperidyl)ethoxy]piperidine di-n-propiodide, 1-methyl-4-phenyl-4-[2-(1-piperidyl)ethoxy]piperidine dibenzochloride or 1-methyl-4-phenyl-4-[2-(1-piperidyl)ethoxy]piperidine dietho-para-toluenesulfonate.

Following the above procedure for the preparation of 1-methyl-4-phenyl-4-[2-(1-piperidyl)ethoxy]piperidine dimethodide using the appropriate piperidine derivative in place of 1-methyl-4-phenyl-4-[2-(1-piperidyl)ethoxy]piperidine, there can be obtained the following quaternary salts: 1-methyl-4-phenyl-4-(2-diethylaminoethoxy)piperidine dimethiodide, 1-n-hexyl-4-phenyl-4-(4-dimethylaminobutoxy)piperidine dimethiodide, 1-isopropyl-4-phenyl-4-(2-di-n-butylaminoethoxy)piperidine dimethiodide, 1-ethyl-4-phenyl-4-[3-(2-methyl-1-piperidyl)propoxy]piperidene dimethiodide, 1-methyl-4-phenyl-4-[2-(2,5-dimethyl-1-pyrrolidyl)ethoxy]piperidine dimethiodide, 1-isobutyl-4-phenyl-4-[3-(1-pyrrolidyl)propoxy]piperidine dimethiodide, 1-methyl-4-phenyl-4-[2-(4-morpholinyl)ethoxy]piperidine dimethiodide, and the like.

I claim:

1. A member of the group consisting of a compound having the formula

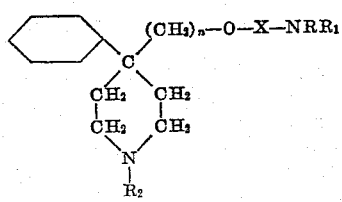

where $n$ is selected from the group consisting of zero and one, X is a lower alkylene radical having from 2 to 4 carbon atoms whose two free valence bonds are on different carbon atoms, $NRR_1$ is a member of the group consisting of lower dialkylamino, 1-piperidyl, (lower alkylated)-1-piperidyl, 1-pyrrolidyl, (lower alkylated)-1-pyrrolidyl and 4-morpholinyl, and $R_2$ is a lower alkyl radical and its acid addition and di-quaternary ammonium salts.

2. A quaternary ammonium salt of a 1-(lower alkyl)-4-phenyl-4-(dialkylaminoalkoxymethyl)piperidine having the formula

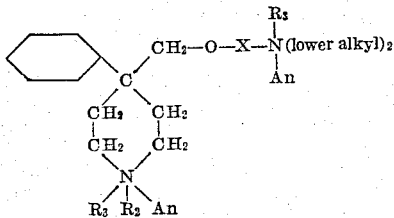

where X is a lower alkylene radical having from 2 to 4 carbon atoms whose two free valence bonds are on different carbon atoms, and $R_2$ and $R_3$ are each lower alkyl radicals, and An is a non-toxic anion.

3. A quaternary ammonium salt of a 1-(lower alkyl)-4-phenyl-4-(diethylaminoalkoxymethyl)piperidine having the formula

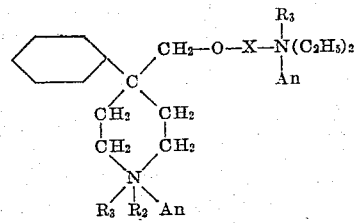

where X is a lower alkylene radical having from 2 to 4 carbon atoms whose two free valence bonds are on different carbon atoms, and $R_2$ and $R_3$ are each lower alkyl radicals, and An is a non-toxic anion.

4. A quaternary ammonium salt of a 1-(lower alkyl)-4-phenyl-4-(dimethylaminoalkoxymethyl)piperidine having the formula

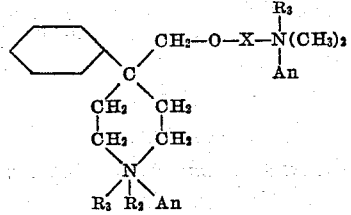

where X is a lower alkylene radical having from 2 to 4 carbon atoms whose two free valence bonds are on different carbon atoms, and $R_2$ and $R_3$ are each lower alkyl radicals, and An is a non-toxic anion.

5. A quaternary ammonium salt of a 1-(lower alkyl)-4-phenyl-4-(tertiary-aminoalkoxymethyl)piperidine having the formula

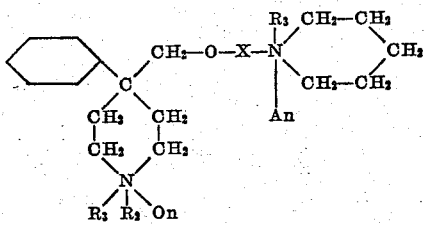

where X is a lower alkylene radical having from 2 to 4 carbon atoms whose two free valence bonds are on different carbon atoms, $R_2$ and $R_3$ are each lower alkyl radicals and An is a non-toxic anion.

6. A quaternary ammonium salt of a 1-(lower alkyl)-4-phenyl-4-(tertiary-aminoalkoxymethyl)piperidine having the formula

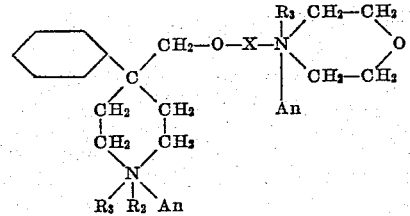

where X is a lower alkylene radical having from 2 to 4 carbon atoms whose two free valence bonds are on different carbon atoms, $R_2$ and $R_3$ are each lower alkyl radicals and An is a non-toxic anion.

7. A quaternary ammonium salt of a 1-(lower alkyl)-4-phenyl-4-(tertiary-aminoalkoxy)piperidine having the formula

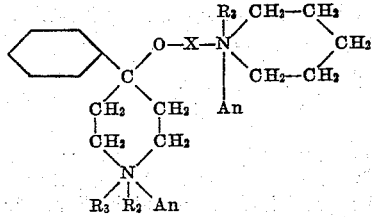

where X is a lower alkylene radical having from 2 to 4 carbon atoms whose two free valence bonds are on different carbon atoms, $R_2$ and $R_3$ are each lower alkyl radicals and An is a non-toxic anion.

8. A dimethohalide of 1-methyl-4-phenyl-4-(2-dimethylaminoethoxymethyl)piperidine.

9. A dimethohalide of 1-methyl-4-phenyl-4-[2-(1-piperidyl)ethoxymethyl]piperidine.

10. A dimethohalide of 1-methyl-4-phenyl-4-[3-(1-piperidyl)propoxymethyl]piperidine.

11. A dimethohalide of 1-methyl-4-phenyl-4-[2-(4-morpholinyl)ethoxymethyl]piperidine.

12. A dimethohalide of 1-methyl-4-phenyl-4-[2-(1-piperidyl)ethoxy]piperidine.

13. A process for the preparation of a compound having the formula

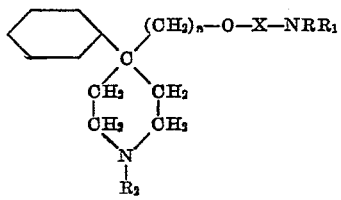

where $n$ is selected from the group consisting of zero and one, X is a lower alkylene radical having from 2 to 4 carbon atoms whose two free valence bonds are on different carbon atoms, $NRR_1$ is a member of the group consisting of lower dialkylamino, 1-piperidyl, (lower alkylated)-1-piperidyl, 1-pyrrolidyl, (lower alkylated)-1-pyrrolidyl and 4-morpholinyl, and $R_2$ is a lower alkyl radical, which comprises heating an alkali metal salt of a member of the group consisting of a 1-(lower alkyl)-4-phenyl-4-piperidinol and a 1-(lower alkyl)-4-phenyl-4-piperidinemethanol with a tertiary-aminoalkyl halide of the formula halogen-X-$NRR_1$.

14. A process for the preparation of a 1-(lower alkyl)-4-phenyl-4-(dialkylaminoalkoxymethyl)piperidine having the formula

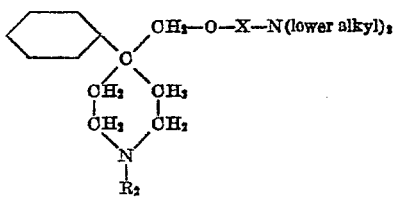

where X is a lower alkylene radical having from 2 to 4 carbon atoms whose two free valence bonds are on different carbon atoms and $R_2$ is a lower alkyl radical, which comprises heating an alkali metal salt of a 1-(lower alkyl)-4-phenyl-4-piperidinemethanol with a dialkylaminoalkyl halide of the formula halogen-X-N(lower alkyl)$_2$.

15. A process for the preparation of a 1-(lower alkyl)-4-phenyl-4-(tertiary-aminoalkoxymethyl)piperidine having the formula

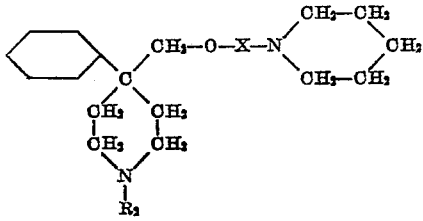

where X is a lower alkylene radical having from 2 to 4 carbon atoms whose two free valence bonds are on different carbon atoms and $R_2$ is a lower alkyl radical, which comprises heating an alkali metal salt of a 1-(lower alkyl)-4-phenyl-4-piperidinemethanol with a tertiary-aminoalkyl halide of the formula

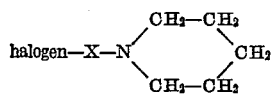

16. A process for the preparation of a 1-(lower alkyl)-4-phenyl-4(tertiary-aminoalkoxymethyl)piperidine having the formula

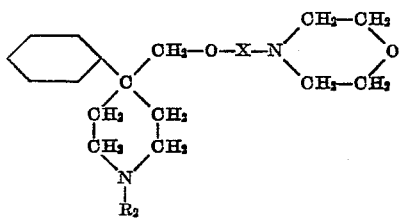

where X is a lower alkylene radical having from 2 to 4 carbon atoms whose two free valence bonds are on different carbon atoms and $R_2$ is a lower alkyl radical, which comprises heating an alkali metal salt of a 1-(lower alkyl)-4-phenyl-4-piperidinemethanol with a tertiary-aminoalkyl halide of the formula

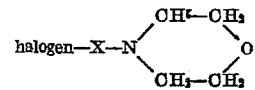

17. A process for the preparation of a 1-(lower alkyl)-4-phenyl-4-(tertiary-aminoalkoxy)piperidine of the formula

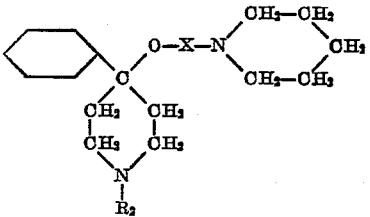

where X is a lower alkylene radical having from 2 to 4 carbon atoms whose two free valence bonds are on different carbon atoms and $R_2$ is a lower alkyl radical, which comprises heating an alkali metal salt of a 1-(lower alkyl)-4-phenyl-4-piperidinol with a tertiary-aminoalkyl halide of the formula

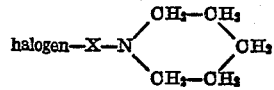

No references cited.